United States Patent
Gui et al.

(10) Patent No.: US 10,534,469 B2
(45) Date of Patent: Jan. 14, 2020

(54) FORCE DETECTION METHOD, APPARATUS AND DEVICE

(71) Applicant: SHENZHEN GOODIX TECHNOLOGY CO., LTD., Shenzhen, Guangdong (CN)

(72) Inventors: Xintao Gui, Guangdong (CN); Xiaoxiang Chen, Guangdong (CN); Jian Cui, Guangdong (CN); Zhiyou Chen, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 2 days.

(21) Appl. No.: 15/942,709

(22) Filed: Apr. 2, 2018

(65) Prior Publication Data
US 2018/0224995 A1    Aug. 9, 2018

Related U.S. Application Data

(63) Continuation of application No. PCT/CN2016/106903, filed on Nov. 23, 2016.

(51) Int. Cl.
*G06F 3/041* (2006.01)
*G01L 1/20* (2006.01)
(Continued)

(52) U.S. Cl.
CPC ............ *G06F 3/0414* (2013.01); *G01L 1/146* (2013.01); *G01L 1/205* (2013.01); *G06F 3/0416* (2013.01); *G06F 3/044* (2013.01); *G06F 3/045* (2013.01)

(58) Field of Classification Search
CPC ...... G06F 3/0414; G06F 3/0416; G06F 3/044; G06F 3/045; G01L 1/146; G01L 1/205
See application file for complete search history.

(56) References Cited

U.S. PATENT DOCUMENTS

| | | | |
|---|---|---|---|
| 9,134,842 | B2 | 9/2015 | Li |
| 2013/0141338 | A1 | 6/2013 | Wei et al. |
| 2018/0081482 | A1* | 3/2018 | Gui .................. G01L 1/142 |

FOREIGN PATENT DOCUMENTS

| CN | 102004573 A | 4/2011 |
|---|---|---|
| CN | 202815747 U | 3/2013 |

(Continued)

OTHER PUBLICATIONS

State Intellectual Property Office of the P.R. China (ISR/CN), "International Search Report for PCT/CN2016/106903", China, dated Aug. 24, 2017.

*Primary Examiner* — Abhishek Sarma
(74) *Attorney, Agent, or Firm* — Heslin Rothenberg Farley & Mesiti P.C.

(57) ABSTRACT

The present invention relates to the field of touch technologies, and provides a force detection method, apparatus and device. The force detection method includes: receiving a deformation caused by external force and identified by at least one sensing electrode, and converting the deformation into a corresponding raw feature value characterized by an electrical signal, wherein the raw feature value corresponds to the force; and calculating force information fed back by the at least one sensing electrode according to the raw feature value of the at least one sensing electrode. With the force detection method, apparatus and device according to the invention, when a plurality of positions is pressed by force, the force information at each position may be accurately acquired. In practice, multi-finger press detection may be implemented on the touch screen by using fewer electrodes, thereby reducing the cost and improving the user experience.

8 Claims, 7 Drawing Sheets

(51) Int. Cl.
  *G01L 1/14* (2006.01)
  *G06F 3/045* (2006.01)
  *G06F 3/044* (2006.01)

(56) References Cited

FOREIGN PATENT DOCUMENTS

| | | | |
|---|---|---|---|
| CN | 203573282 U | 4/2014 | |
| CN | 205384596 U | 7/2016 | |
| JP | 5628885 B2 | 11/2014 | |
| KR | 20040111634 A | 12/2004 | |
| KR | 100997107 B1 | 11/2010 | |
| WO | WO-2010018889 A1 * | 2/2010 | ........... G06F 3/0414 |

* cited by examiner

| Force<br>Sensor | $F_0$ | $F_1$ | $F_2$ | $F_3$ | $F_4$ | $F_5$ | ... |
|---|---|---|---|---|---|---|---|
| S0 | $y_{00}$ | $y_{01}$ | $y_{02}$ | $y_{03}$ | $y_{04}$ | $y_{05}$ | ... |
| ⋮ | ⋮ | ⋮ | ⋮ | ⋮ | ⋮ | ⋮ | ⋮ |
| S8 | $y_{80}$ | $y_{81}$ | $y_{82}$ | $y_{83}$ | $y_{84}$ | $y_{85}$ | |

|  | S0 | S1 | S2 | S3 | S4 | S5 | S6 | S7 | S8 |
|---|---|---|---|---|---|---|---|---|---|
| $C_0$ | $u_{00}$ | $u_{01}$ | $u_{02}$ | $u_{03}$ | $u_{04}$ | $u_{05}$ | $u_{06}$ | $u_{07}$ | $u_{08}$ |
| ⋮ | ⋮ | ⋮ | ⋮ | ⋮ | ⋮ | ⋮ | ⋮ | ⋮ | ⋮ |
| $C_{N-1}$ | $u_{N-1,0}$ | $u_{N-1,1}$ | $u_{N-1,2}$ | $u_{N-1,3}$ | $u_{N-1,4}$ | $u_{N-1,5}$ | $u_{N-1,6}$ | $u_{N-1,7}$ | $u_{N-1,8}$ |

FIG. 6c

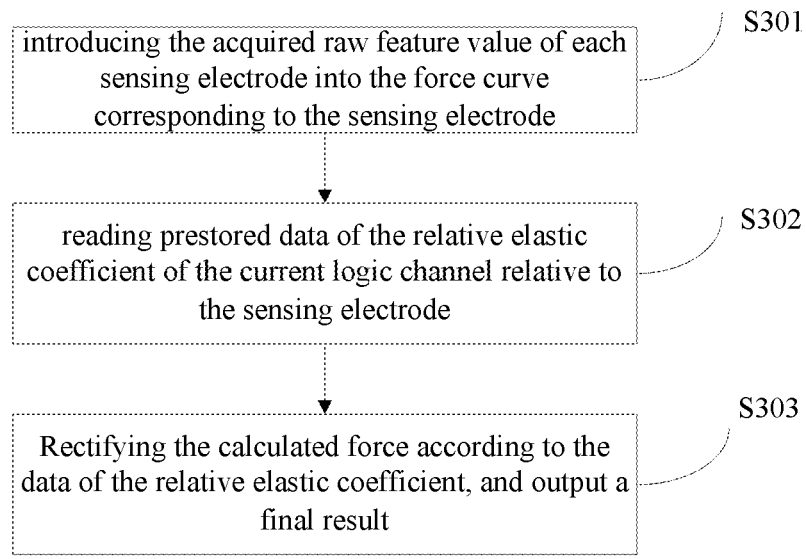

S301 introducing the acquired raw feature value of each sensing electrode into the force curve corresponding to the sensing electrode S302 reading prestored data of the relative elastic coefficient of the current logic channel relative to the sensing electrode S303 Rectifying the calculated force according to the data of the relative elastic coefficient, and output a final result

FIG. 7

FORCE DETECTION METHOD, APPARATUS AND DEVICE

CROSS-REFERENCE TO RELATED APPLICATIONS

The present application is a continuation of international application No. PCT/CN2016/106903, filed on Nov. 23, 2016, which is incorporated herein by reference in its entirety.

TECHNICAL FIELD

The present invention relates to the field of touch technologies, and in particular, relates to a force detection method, apparatus and device.

BACKGROUND

Mobile electronic devices bring great convenience to people's daily life, and have become an indispensable tool for people. A mobile electronic device has multiple types of input apparatuses, for example, keypad, mouse, operating lever, laser pen, touch screen and the like. The touch technology is quickly and widely applied to various electronic devices because of good interactability thereof. This technology is becoming matured, and various possible applications based on this technology are being deeply explored.

With development of the touch technology, users are imposing higher and higher requirements on operation experience of electronic devices such as mobile phones, tablets and the like, and expect more convenient man-machine interaction experience. The force detection technology further provides another dimension of information in addition to the location information provided by the touch technology. Various applications may be developed based on the input force information, which provides a new operation experience for the users in the use of the electronic devices, for example, pop-up of a pull-down menu or a "small suspended ball" when the screen is pressed with a force, acceleration of the up-down roll and left-right roll when the screen is pressed with greater force, touch fed back and the like effect.

During practice of the present invention, the inventors have found that the related art has at least the following problem: in the conventional touch force detection apparatus, a large number of electrodes (or sensors) need to be arranged for more accurate force detection, thus the cost is high, and force detection of multi-touch may not be realized.

SUMMARY

To remove the defect in the product in the related art, the present invention provides a force detection method, apparatus and device, which may achieve multi-finger force detection by using fewer electrodes.

To solve at least one of the above technical problems, embodiments of the present application employ the following technical solutions.

The present invention provides a force detection method, which includes: receiving a deformation caused by external force and identified by at least one sensing electrode, and converting the deformation into a corresponding raw feature value characterized by an electrical signal, wherein the raw feature value corresponds to the force; and calculating force information fed back by the at least one sensing electrode according to the raw feature value of the at least one sensing electrode.

As a further possible improvement of the present invention, prior to the calculating force information fed back by the at least one sensing electrode according to the raw feature value of the at least one sensing electrode, the method further includes: acquiring a force curve corresponding to each of the at least one sensing electrode, the force curve represents a relationship between the raw feature value of the corresponding sensing electrode and the force, where the force curve can be acquired by way of directly presetting or independently establishing; and acquiring a relative elastic coefficient of any position relative to each sensing electrode, where the relative elastic coefficient can be acquired by way of directly presetting or independently establishing, and the relative elastic coefficient is configured to indicate a difference of deformation of the sensing electrode when force is applied to different positions relative to the identical sensing electrode.

As a further possible improvement of the present invention, the acquiring a relative elastic coefficient of a position relative to each sensing electrode includes: dividing the entire touch screen into a plurality of regions, each region is configured as a logic channel; pressing the center of each region with predetermined force, and recording feature data of each sensing electrode; introducing the recorded feature data of each sensing electrode into the force curve corresponding to each sensing electrode to obtain calculated force; and calculating the relative elastic coefficient of each logic channel relative to each sensing electrode according to the calculated force.

As a further improvement of the present invention, the step of calculating force information fed back by each sensing electrode according to the raw feature value of each sensing electrode includes: introducing the acquired raw feature value of each sensing electrode into the force curve corresponding to the sensing electrode; reading prestored data of the relative elastic coefficient of the current logic channel relative to the sensing electrode; and rectifying the calculated force according to the data of the relative elastic coefficient, and outputting a final result.

As a further improvement of the present invention, if the press position does not fall at the center of the logic channel, the relative elastic coefficient at the press position is estimated according to the relative elastic coefficient of the logical channel adjacent to the press position.

As another alternative of the present invention, when M different positions are respectively pressed by M forces simultaneously, a set of equations can be established based on forces fed back by the sensing electrodes and relative elastic coefficients at the M positions relative to the sensing electrodes, and Q equations are selected from the set of equations to solve the force corresponding to each position, where Q and M are both positive integers, and Q≥M.

The present invention provides a force detection module. The force detection module includes: a force detecting unit, configured to acquire a deformation caused by external force and identified by at least one sensing electrode, and convert the deformation into a corresponding raw feature value characterized by an electrical signal, the raw feature value corresponding to the force; and a processing unit, configured to calculate force information fed back by the at least one sensing electrode according to the raw feature value of the at least one sensing electrode.

As a further improvement of the present invention, the force detection module further includes: a first acquiring unit, configured to acquire a force curve corresponding to each of the at least one sensing electrode, where the force curve represents a relationship between the raw feature value of the corresponding sensing electrode and the force, wherein the force curve is acquired by way of directly prestoring or independently establishing; and a second acquiring unit, configured to acquire a relative elastic coefficient of any position relative to each sensing electrode, wherein the elastic coefficients are acquired by way of directly presetting or independently establishing, and the relative elastic coefficient is used to indicate a difference of deformation of a sensing electrode when force is applied to different positions relative to the identical sensing electrode.

As a further improvement of the present invention, the second acquiring unit is specifically configured to: divide the entire touch screen into a plurality of regions, each region is configured as a logic channel; press the center of each region with predetermined force, and record feature data of each sensing electrode; introduce the recorded feature data of each sensing electrode into a force curve corresponding to each sensing electrode to calculate the force; and calculate the relative elastic coefficient of each logic channel relative to each sensing electrode according to the calculated force.

As a further improvement of the present invention, the processing unit is specifically configured to: introduce the acquired raw feature value of each sensing electrode into the force curve corresponding to the sensing electrode; read prestored data of the relative elastic coefficient of the current logic channel relative to the sensing electrode; and rectify the calculated force according to the data of the relative elastic coefficient, and output a final result.

As a further improvement of the present invention, when the press position does not fall at the center of the logic channel, the relative elastic coefficient at the press position is estimated according to the relative elastic coefficient of the logical channel adjacent to the press position.

As a further improvement of the present invention, when M different positions are respectively and simultaneously pressed, a set of equations can be established based on force fed back by the sensing electrodes and relative elastic coefficients at the M positions relative to the sensing electrodes, and Q equations can be selected from the set of equations to solve the force corresponding to each position, wherein Q and M are both positive integers, and Q≥M.

The present invention provides a force detection device. The force detection device includes: a force sensor, includes at least one sensing electrode, and configured to identify a deformation caused by external force applied to the force sensor, and convert the deformation into a corresponding raw feature value characterized by an electrical signal, the raw feature value corresponds to the force; at least one processor, configured to calculate force information fed back by the at least one sensing electrode according to the raw feature value of the at least one sensing electrode; and a memory, configured to store data supporting normal operation of the processor.

As a further improvement of the present invention, the force sensor includes a resistive sensor and/or a capacitive sensor.

As a further improvement of the present invention, the force sensor further includes a press surface and a detection circuit unit; wherein when the external force is applied to the press surface, a deformation of the press surface causes a resistance and/or capacitance variation between the press surface and the sensing electrode, the detection circuit unit is configured to identify the resistance and/or capacitance variation and convert the variation into an electrical signal, the electrical signal is output in a specific format to be the raw feature value representing a corresponding press force.

Compared with the related art, the present invention may have one or more of the following advantages:

1. With reference to the coordinate information reported by the touch screen, by using the virtual logical channels obtained by region division and using the spatial interpolation method, the consistency of the acquired force information in terms of spatial position may be improved.

2. By using the above interpolation method, even if the press position does not fall at the center of the logic channel, the relative elastic coefficient at the press position may be effective estimated according to the relative elastic coefficient of the logic channel in the vicinity of the press position, thereby ensuring accuracy of the acquired force information.

3. When M force touches are applied to M different press positions, a set of equations is established according to the forces fed back by the sensing electrodes and the relative elastic coefficients at the M positions relative to the sensing electrodes, and Q equations are selected from the set of equations and solved to obtain the forces corresponding to the M positions. In this way, when force is applied to a plurality of positions, force information at each position may be accurately acquired. In practice, multi-finger press detection may be realized on the touch screen by using a fewer sensing electrodes, thereby reducing the roving the user experience.

BRIEF DESCRIPTION OF THE DRAWINGS

To describe technical solutions according to the embodiments of the present invention, drawings that are to be referred for description of the embodiments are briefly described hereinafter. Apparently, the drawings described hereinafter merely illustrate some embodiments of the present invention. Persons of ordinary skill in the art may also derive other drawings based on the drawings described herein without any creative effort.

FIG. 6c is a record table of relative elastic coefficients according to an embodiment of the present invention;

FIG. 7 is a schematic flowchart of a force detection method according to another embodiment of the present invention;

DETAILED DESCRIPTION

In order to facilitate understanding of the present invention, the present invention will be described more comprehensively with reference to relevant drawings. The accompanying drawings show preferred embodiments of the present invention. However, the present invention may be implemented in a plurality of forms or ways, and is not limited to the embodiments described herein. On the contrary, these embodiments are provided to make the understanding of the disclosed contents of the present invention more thorough and comprehensive.

Unless otherwise defined, all the technical and scientific terms used in this specification are the same as those usually understood by persons skilled in the art of the present invention. The terms in the specification of the present invention are only used to describe the specific embodiments, but not to limit the present invention.

Embodiment 1

Figure 1:
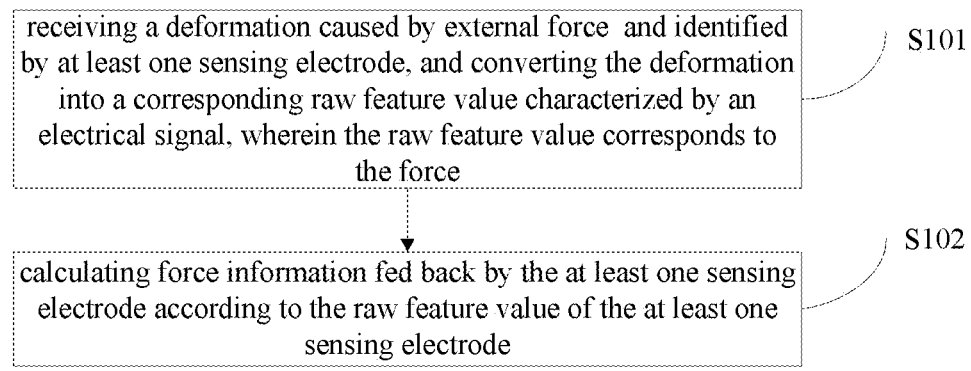
FIG. 1 is a schematic flowchart of a force detection method according to an embodiment of the present invention.

Referring to FIG. 1, FIG. 1 is a schematic flowchart of a force detection method according to an embodiment of the present invention. This embodiment specifically illustrates the above described force calculation method, which includes the following steps:

S101: Acquiring a deformation caused by external force applied to at least one sensing electrode and identifying the deformation by the sensing electrode, where the deformation is converted into a corresponding raw feature value characterized by an electrical signal, wherein the raw feature value corresponds to the force.

Figure 2:
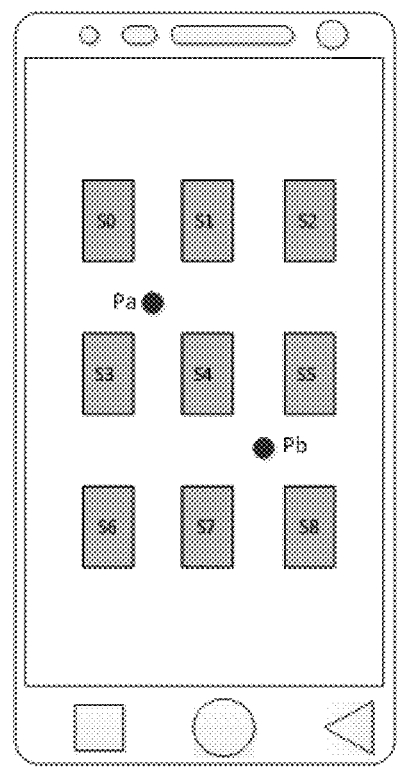
FIG. 2 is a schematic diagram of distribution of sensing electrodes according to an embodiment of the present invention.

In the embodiment of the present invention, the above step can be practiced by a force sensor. The force sensor may be formed by a plurality of sensing electrodes, and the force sensor may be a capacitive sensor, a resistive sensor or the like. In some embodiments of the present invention, the force sensor is a capacitive sensor. The sensing electrodes may be different types of sensing electrodes. In some embodiments of the present invention, the sensing electrodes may also be the similar sensing electrodes. The number of sensing electrodes may be defined according to the actual needs. Considering the cost and performance, the number of sensing electrodes in this embodiment can be 9. Referring to FIG. 2, S0, S1, S2, S3, S4, S5, S6, S7 and S8 are all sensing electrodes. However, the number of sensing electrodes for implementing the present invention is not limited to 9, or may be, for example, 8, 4 or 15.

The force sensor further includes a press surface and a detection circuit unit. When external force is applied to the press surface, a deformation of the press surface causes a capacitance variation between the press surface and the sensing electrode, the detection circuit unit is configured to identify the capacitance variation and convert the variation into an electrical signal, and the electrical signal is output in a specific format, and the electrical signal is regarded as the raw feature value representing a corresponding press force.

S102: calculating force information fed back by the at least one sensing electrode according to the raw feature value of the at least one sensing electrode.

Firstly, before or when the force information is calculated, in this embodiment, a force curve corresponding to each sensing electrode needs to be acquired. The force curve corresponding to each sensing electrode is acquired by reading prestored force curve data from stored data in the system. The prestored force curve data may be acquired by directly storing established formula parameters relevant to the force curves or sample data tables under different forces established and stored according to the formula. The force curve refers to a relationship between a raw feature value and a force (that is, a press force hereinafter) detected by the corresponding sensing electrode when the reference point of each sensing electrode is pressed. This relationship may be referred to as an R-F curve (Rawdata-Force curve), and marked as $R_j=f_j(\theta_j, F)$ (j=0, 1, K 8), wherein $\theta_j$ is a parameter vector to be determined. The force curve may be prestored in each device before delivery from factory, and a respective force curve may be established for each device. Alternatively. Several sample devices may be selected from a batch of devices as samples for establishment of the force curve, and the force curves that are the same as that of the sample devices may prestored in the other devices. During the use of the devices after delivery from factory, these prestored force curves are read when force information needs to be read.

Optionally, the R-F curve may be established in advance by pressing a corresponding sensing electrode and acquiring relevant sample data, and then by means of curve fitting. A fitting function may adopt simple polynomial fitting or may be established according to the detection circuit and the selected sensing electrode structure.

In this embodiment, the press position may be the center point of each sensing electrode or may be any position of each sensing electrode, thus the position is referred to as the reference point of the sensing electrode. Preferably, the reference point is the position where the deformation amount of the sensing electrode is the maximum. A plurality of sample forces may be selected with reference to the maximum force and the minimum force during use of the user.

Specifically:

n different sample forces $F_i$ (i=1, 2, K n) are applied on the reference point of each sensing electrode, and the raw feature value (Rawdata) are recorded, which including nine groups, where a group of R-F data corresponding to a sensing electrode S0 is $(F_1, r_{01})$, $(F_2, r_{02})$, K, $(F_n, r_{0n})$, a group of R-F data corresponding to a sensing electrode S1 is $(F_1, r_{11})$, $(F_2, r_{12})$, K, $(F_n, r_{1n})$, . . . , and a group of R-F data corresponding to a sensing electrode S8 is $(F_1, r_{81})$, $(F_2, r_{82})$, K, $(F_n, r_{8n})$.

With reference to the assumed function model of the R-F curve $R_j=f_j(\theta_j, F)$ (j=0, 1, K 8) of each sensing electrode, fitting is performed using the raw sample data $(F_1, r_{01})$, $(F_2,$ $r_{02}$), K, ($F_n$, $r_{0n}$), ($F_1$, $r_{11}$), ($F_2$, $r_{12}$), K, ($F_n$, $r_{1n}$), . . . , ($F_1$, $r_{11}$), ($F_2$, $r_{12}$), K, ($F_n$, $r_{1n}$) to determine the parameter $\theta_j$ (j=0, 1, K 8).

After the parameter $\theta_j$ in the R-F curve $R_j=f_j(\theta_j, F)$ is determined, the corresponding force may be calculated by introducing the raw feature value detected in real time by the force sensor into $R_j=f_j(\theta_j, F)$ (j=0, 1, K 8).

Figures 3, 4:
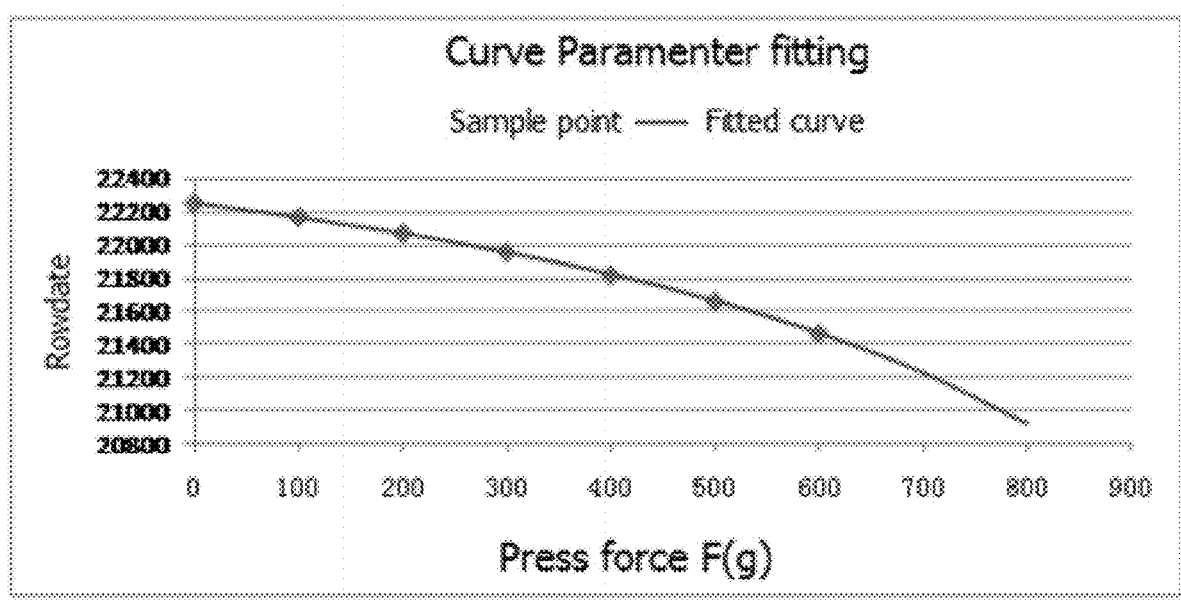
FIG. 3 is a schematic diagram of a force curve according to an embodiment of the present invention.
FIG. 4 is a relationship table between raw feature value of all the sensing electrodes and forces according to an embodiment of the present invention.

For example, referring to FIG. 3, sample data corresponding to the force $F_i$ being 0 gf, 100 gf, 200 gf, 300 gf, 400 gf, 500 gf and 600 gf is acquired in advance respectively, and fitting is performed based on the sample data and then the R-F curve can be drawn. As seen from FIG. 3, all of the sample data may fall on the fitting curve well. In other embodiments, the sample data of the force $F_i$ is not only limited to 0 gf, 100 gf, 200 gf, 300 gf, 400 gf, 500 gf and 600 gf, and may be the force in any value within a measurement range of the force sensor.

To simplify the calculation workload and increase the data processing speed of the processor, a raw feature value corresponding to the force sample $F_i$ according to $R_j=f_j(\theta_j, F)$ (j=0, 1, K 8) may be used to establish a lookup table of data, and then the force information corresponding to the raw feature value may be acquired by searching the lookup table.

Referring to FIG. 4, a Rawdata-Force relationship table is established for each sensing electrode according to $R_j=f_j(\theta_j, F)$ (j=0, 1, K 8) with a specific pressure interval marked as step (for example, 50 gf), and data of the established table may be stored in a flash memory. Assume that under certain force, the raw feature value of the jth sensing electrode acquired in real time is $y_j$, and $y_j$ is between feature data $y_{j,i}$ corresponding to a preset force $F_i$ and feature data $y_{j,i+1}$ corresponding to another preset force $F_{i+1}$. That is, $y_{j,i} \geq y_j \geq y_{j,i+1}$ (or $y_{j,i} \leq y_j \leq y_{j,i+1}$), then the force can be calculated by piecewise approximation linearization method, that is, $$F = F_i + step * \frac{y_{j,i} - y_j}{y_{j,i} - y_{j,i+1}}$$

When the press position is Pa or Pb as shown in FIG. 2, one or more sensing electrodes may be selected from the nine sensing electrodes to calculate the force. Selection of the sensing electrode may be based on the press position and the position of the sensing electrode or the deformation amount thereof. When a plurality of sensing electrodes are selected to calculate the force, the force calculated based on the plurality of sensing electrodes may be weighted and averaged and then the average value can be used as the force of the current force of pressing.

Figure 5A:
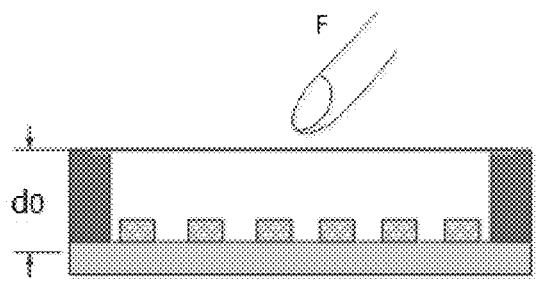
FIG. 5a is a schematic structural diagram of an initial state of sensing electrodes in the X direction according to an embodiment of the present invention.
Figure 5B:
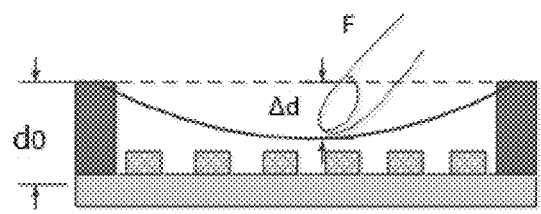
FIG. 5b is a schematic structural diagram of pressing a middle position of the sensing electrodes in the X direction according to an embodiment of the present invention.
Figure 5C:
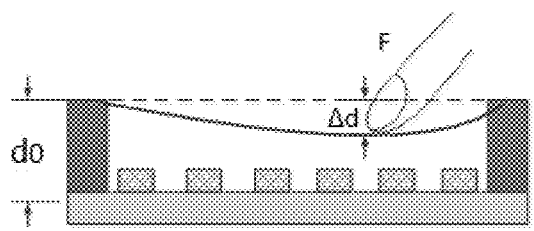
FIG. 5c is a schematic structural diagram of pressing a position proximate to a right edge of the sensing electrodes in the X direction according to an embodiment of the present invention.
Figure 5D:
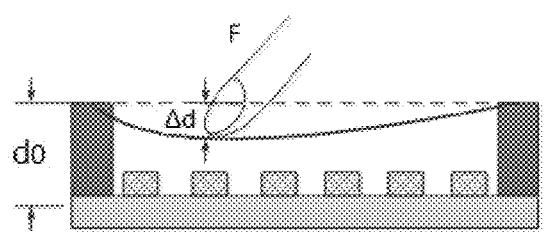
FIG. 5d is a schematic structural diagram of pressing a position proximate to a left edge of the sensing electrodes in the X direction according to an embodiment of the present invention.

FIG. 5a is a schematic structural diagram of an initial state of sensing electrodes in the X direction according to the present invention. FIG. 5b is a schematic structural diagram of pressing a middle position of the sensing electrodes in the X direction according to the present invention. FIG. 5c is a schematic structural diagram of pressing a position proximate to a right edge of the sensing electrodes in the X direction according to the present invention. FIG. 5d is a schematic structural diagram of pressing a position proximate to a left edge of the sensing electrodes in the X direction according to the present invention. In these drawings, d0 represents a default distance between the press surface and the sensing electrode, and Δd represents a deformation amount thereof. For ease of description, only a portion between the press surface and the sensing electrode is illustrated. In practice, the sensing electrode is not limited to the position as illustrated in the drawings. With reference to FIG. 5a, FIG. 5b, FIG. 5c and FIG. 5d, when force is applied to positions close to the left and right edges, the deformation amount of the sensing electrode is smaller than the deformation amount of the sensing electrode when the identical force is applied to the center. If the force information is measured only based on the deformation amount, when the identical force is applied to different positions of the sensing electrode, the force of different positions calculated by the system may be greatly different. Analogously, when force is applied to different positions along the Y-axis direction, the deformation amounts of the sensing electrode may also be different. The X-axis direction and the Y-axis direction herein refer to the X-axis direction and the Y-axis direction of the touch screen in a two-dimensional coordinate system, which may also be understood as a horizontal direction and a vertical direction.

With respect to the same sensing electrode, when a user applies the same force to different positions, the deformation amounts of the sensing electrode may be different. As known that a definite relationship is existed between the force and the deformation amount, and the definite relationship is determined by the physical structure of the touch screen. Based on the theory of thin plate small deflection, the relationship may be quantitatively established and the force output at different positions may be rectified according to the definite relationship, such that when the same force is applied to different positions, the force information acquired at the same sensing electrode is the same.

Based on the theory of thin plate small deflection, it may be derived that the deformation amount and the force are subject to an approximately linear relationship. Assume that the force is applied to the center of the sensing electrode S0, the deformation amount at the sensing electrode S0 and the force satisfy the formula $F=k_0\Delta d$. When the force is applied to the position Pa, the deformation amount of the sensing electrode S0 and the force satisfy the formula $F=k_{a0}\Delta d$. It is known that the raw feature value detected at the sensing electrode S0 is absolutely determined by the deformation amount of the sensing electrode S0. That is, no matter which position is pressed, as long as the deformation amount of the sensing electrode S0 is the same, the raw feature value detected at the sensing electrode S0 is the same.

Assume that force $F_a$ is applied at the position Pa, thus the deformation amount of the sensing electrode S0 is $\Delta d_{a0}$. If force is directly applied at the central point of the sensing electrode S0 such that the deformation amount of the sensing electrode S0 is still $\Delta d_{a0}$, thus the force is $F_0$. That is, with respect to the sensing electrode S0, press at the reference point of the sensing electrode S0 with the force $F_0$ is equivalent to press at the position Pa with force $F_a$, and the raw feature values detected by the sensing electrode S0 are the same. Based on the above analysis, the following relation may be obtained:

$$F_a = k_{a0}\Delta d_{a0}, F_0 = k_0\Delta d_{a0} \Rightarrow F_a = \frac{k_{a0}}{k_0}F_0$$

In this embodiment, when the force is applied at the position Pa, the raw feature value detected by the sensing electrode S0 is introduced into the R-F curve $R_0=f_0(\theta_0, F)$ of the sensing electrode S0 to calculate an equivalent force $F_0$, the actual force $F_a$ is acquired by multiplying $F_0$ with $$\frac{k_{a0}}{k_0}.$$

It defines that $$\frac{k_{a0}}{k_0}$$

is a relative elastic coefficient of the position Pa relative to the sensing electrode S0. The relative elastic coefficient mainly reflects a deformation amount difference at the same position when any different positions are pressed with the identical force, and the deformation amount is mainly determined by the physical structure. With respect to the same sensing electrode, the relative elastic coefficient at each position relative to each sensing electrode may be acquired by a test in advance. With respect to any position P, a relative elastic coefficient exists relative to each sensing electrode, which includes: $u_{p0}$, $u_{p1}$, $u_{p2}$, $u_{p3}$, $u_{p4}$, $u_{p5}$, $u_{p6}$, $u_{p7}$ and $u_{p8}$.

Figure 6A:
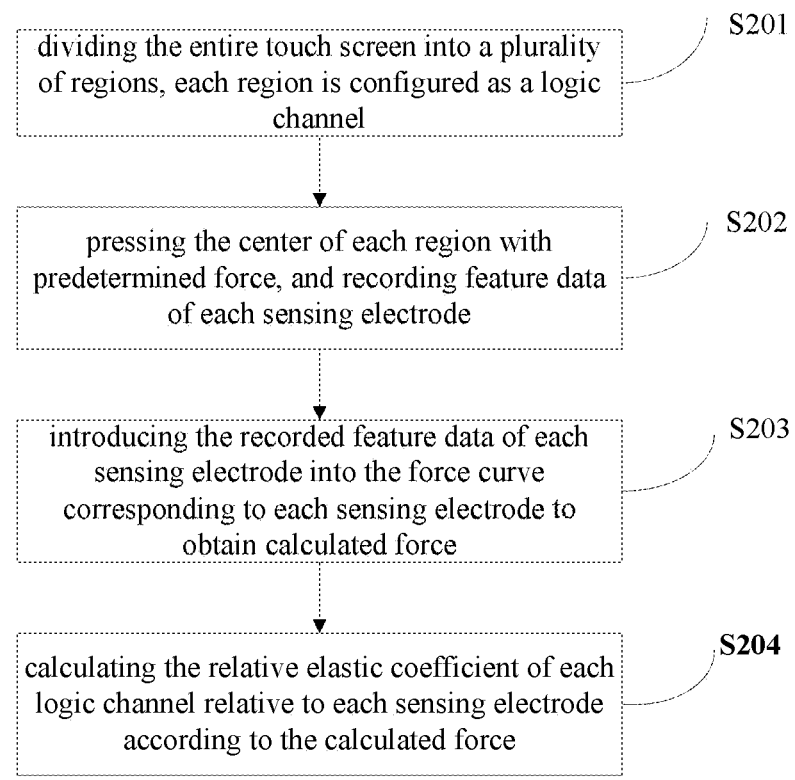
FIG. 6a is a schematic flowchart of a force detection method according to another embodiment of the present invention.

Referring to FIG. 6a, FIG. 6a is another schematic flowchart of a force detection method. A relative elastic coefficient at any position P relative to each sensing electrode is acquired by logic channel division and spatial interpolation. The process specifically may include the following steps:

S201: The entire touch screen is divided into regions, wherein each region is regarded as a logic channel.

Figure 6B:
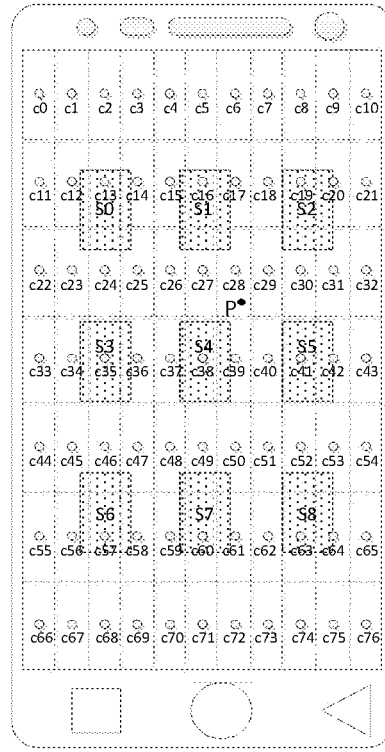
FIG. 6b is a schematic diagram of region division according to an embodiment of the present invention.

Referring to FIG. 6b, the whole touch screen is divided into N regions respectively marked as $C_0$, $C_1$, . . . , $C_{N-1}$, wherein each region is regarded as a logic channel. In this embodiment, the region division can be practiced in any manner, such as uniform division or non-uniform division. In addition, the division manner may be selected according to the actual needs, and the number N of regions is determined by the division manner.

S202: The center of each region is pressed by predetermined force, and feature data of each sensing electrode is recorded.

Specifically, m (m≥1) predetermined touch pressures (force) $F_1$, $F_2$, L $F_m$ are respectively applied to the center of each logic channel, and the data of each sensing electrode is recorded, that is, the data of each sensing electrode is recorded as $R_{i0}^k$, $R_{i1}^k$, . . . , $R_{i8}^k$ (k=1, 2, L, m, and i=1, 2, L, N−1) when predetermined force $F_k$ is applied to a logic channel $C_i$.

S203: The recorded feature data of each sensing electrode is introduced into a force curve corresponding to each sensing electrode to calculate a force.

The data $R_{i0}^k$, $R_{i1}^5$, . . . , $R_{i8}^k$ (k=1, 2, L, m and i=1, 2, L, N−1) obtained in step S202 is introduced into the corresponding R-F curve $R_j=f(\theta_j, F)$ (j=0, 1, K 8) to calculate the force, which can be respectively marked as $F_{i0}^k$, $F_{i1}^k$, . . . , $F_{i8}^k$ (k=1, 2, L, m and i=1, 2, L, N−1).

S204: The relative elastic coefficient of each logic channel relative to each sensing electrode is calculated according to the calculated force.

The relative elastic coefficient $u_{ij}$ of the logical channel $C_i$ at the sensing electrode $S_j$ is calculated according to the force calculated in step S203, where $$u_{ij} = \frac{1}{m}\sum_{k=1}^{m}\frac{F_k}{F_{ij}^k}(i = 0, 1, K\ N-1 \text{ and } j = 0, 1, K\ 8),$$

and the data of the relative elastic coefficients $u_{ij}$ are recorded. The data is stored in a memory, as illustrated in FIG. 6c.

Through the above steps, the relative elastic coefficient $u_{ij}$ of the current logic channel $C_i$ relative to any sensing electrode $S_j$ may be definitely acquired. Based on the above analysis, in some embodiments of the present invention, the relative elastic coefficient of the current logic channel relative to each sensing electrode is acquired according to the coordinate information reported by the touch screen and the logic channels obtained by region division, thus the force fed back by each sensing electrode is rectified. In this way, consistency of the force output by the system when the same force is applied to different positions may be optimized.

Referring to FIG. 7, FIG. 7 is another schematic flowchart of a force detection method according to one embodiment of the present invention. Based on the above steps, the calculation process of the force information during practical operations of the user may be further determined. The process includes the following steps:

S301: Introducing the acquired raw feature values of each sensing electrode into the force curve corresponding to the sensing electrode.

The raw feature values $R_0$, $R_1$, . . . , $R_8$ of each sensing electrode are respectively introduced into the R-F curve $R_j=f_j(\theta_j, F)$ (j=0, 1, K 8) corresponding to the sensing electrode to calculate the force fed back by each sensing electrodes, which are marked as $F_0$, $F_1$, . . . , $F_8$.

S302: Reading the prestored data of the relative elastic coefficient of the current logic channel relative to each sensing electrode.

The logic channel $C_i$ corresponding to the current pressed central position can be determined according to position coordinate information reported by the system, and then the relative elastic coefficients $u_{i0}$, $u_{i1}$, . . . , $u_{i8}$ of the logic channel $C_i$ relative to each sensing electrode can be obtained.

S303: Rectifying the calculated force according to the data of the relative elastic coefficient, and outputting a final result.

As seen from $F'_0=u_{i0}F_0$, $F'_1=u_{i1}F_1$, . . . , $F'_8=u_{i8}F_8$, the final result, that is, the final output force can be a composite reflection of $F'_0$, $F'_1$, . . . , $F'_8$, for example, making an average thereof, or a weighted average value based on the distance between the logic channel and the sensing electrode, or only calculating the force according to the sensing electrode most proximate to the current logic channel.

As known from the above analysis, the relative elastic coefficient is calculated using the case where the press position is the central position of the logic channel as a reference. Therefore, when the user's actual press position does not fall at the central position of the logic channel, the acquired force information may be subject to a deviation. To reduce the deviation, the number of divided logic channels may be increased. However, considering such factors as storage space, and mass production efficiency, the practically divided logic channels N should be limited. The relative elastic coefficient may be prestored in each device before delivery from factory, and a respective set of relative elastic coefficients may be established for each device. Alternatively, several sample devices may be selected from a batch of devices for establishment of the relative elastic coefficients, and the relative elastic coefficients obtained by the sample devices may be prestored in the other devices.

Figure 8A:
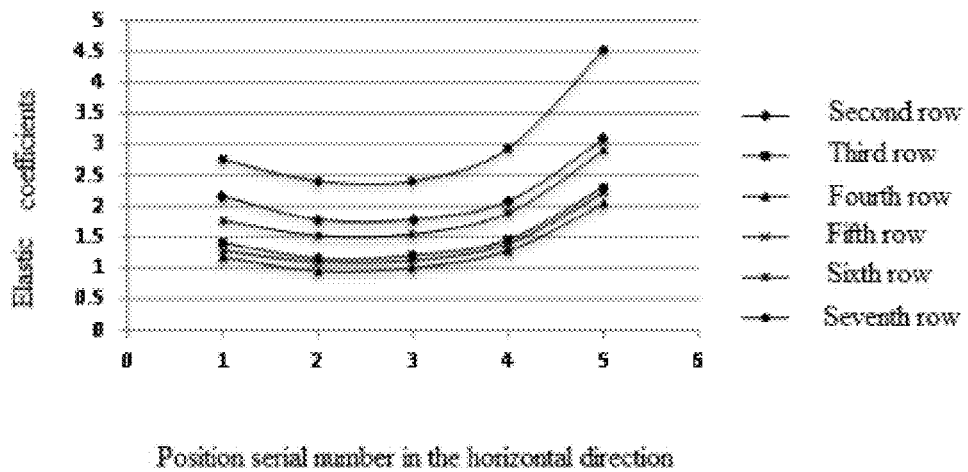
FIG. 8a is a schematic diagram of relative elastic coefficients of positions in a row at a sensing electrode S4 according to an embodiment of the present invention.
Figure 8B:
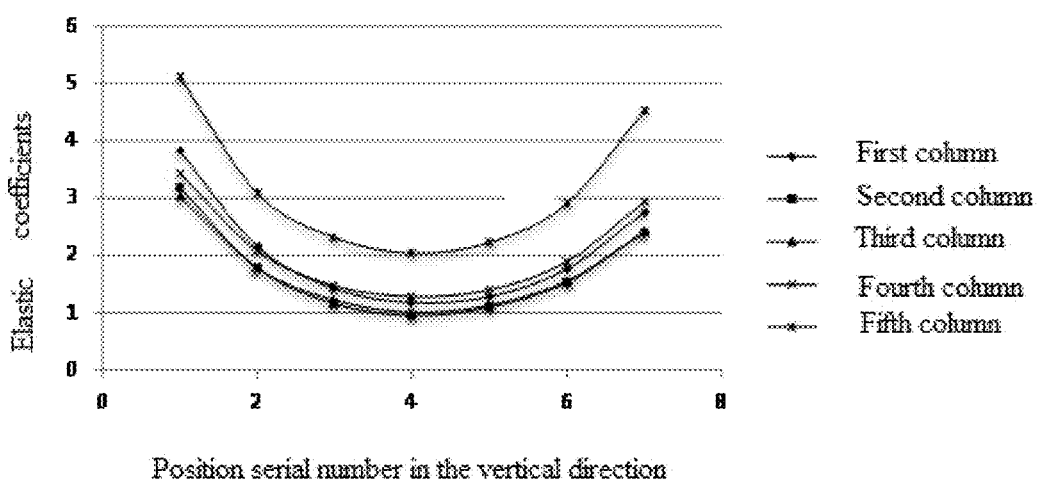
FIG. 8b is a schematic diagram of relative elastic coefficients of positions in a column at a sensing electrode S4 according to an embodiment of the present invention.

To solve this problem, the force detection method according to the present invention further provides a calculation method based on spatial interpolation. Referring to FIG. 8a, FIG. 8a illustrates relative elastic coefficients in a row at a sensing electrode S4 according to the present invention, wherein each curve represents the relative elastic coefficients at different positions in a row as illustrated in FIG. 6b, and reflects a variation regulation of the relative elastic coefficients along a horizontal direction. Referring to FIG. 8b, FIG. 8b illustrates relative elastic coefficients in a column at a sensing electrode S4 according to the present invention, wherein each curve represents the relative elastic coefficients at different positions in a column as illustrated in FIG. 6b, and reflects variation regulation of the relative elastic coefficients along a vertical direction.

As seen from FIG. 8a and FIG. 8b, variations of the relative elastic coefficients along the horizontal direction or the vertical direction are all contiguous. Therefore, when the actual press position does not fall at the center of the logic channel, the relative elastic coefficient at the press position is estimated according to the relative elastic coefficient of the logical channel adjacent to the position. The relative elastic coefficient at the position P in FIG. 6b may be estimated based on the relative elastic coefficients of the logic channels C28, C29, C39 and C40, and a plurality of possible estimation methods may be used according to the actual situation, for example, the bilinear interpolation.

Assume that the upper left corner of the press surface is the zero point of the coordinate, and the coordinates of the position P are (x, y) and the coordinates of the logic channels C28, C29, C39 and C40 are ($x_{28}$, $y_{28}$), ($x_{29}$, $y_{29}$), ($x_{39}$, $y_{39}$) and ($x_{40}$, $y_{40}$) respectively, when a sensing electrode S4 is used as a reference, the relative coefficients at the logic channels C28, C29, C39 and C40 are respectively $u_{28}$, $u_{29}$, $u_{39}$ and $u_{40}$. Accordingly:

Interpolation along the Y-axis:

$$u_{y1} = \frac{y_{39} - y}{y_{39} - y_{28}} u_{28} + \frac{y - y_{28}}{y_{39} - y_{28}} u_{39},$$

$$u_{y2} = \frac{y_{40} - y}{y_{40} - y_{29}} u_{29} + \frac{y - y_{29}}{y_{40} - y_{29}} u_{40}$$

Interpolation along the X-axis:

$$u_P = \frac{x_{29} - x}{x_{29} - x_{28}} u_{y1} + \frac{x - x_{28}}{x_{29} - x_{28}} u_{y2}$$

In addition, a plurality of logic channels in the vicinity of the position P may also be selected to estimate the relative elastic coefficient at the position P by way of surface fitting. For example, nine logic channels C16, C17, C18, C27, C28, C39, C38, C39 and C40 as illustrated in FIG. 6b may be selected to estimate the relative elastic coefficient by quadric surface fitting.

By using the above interpolation method, even if the press position does not fall at the center of the logic channel, the relative elastic coefficient at the press position may be effective estimated according to the relative elastic coefficient of the logic channel in the vicinity of the press position, thereby ensuring accuracy of the acquired force information.

Embodiment 2

Based on the embodiment 1, this embodiment 2 provides another embodiment of the force detection method according to the present invention. This embodiment of the present invention further provides a force detection method in case of multi-point press, which will be briefly described with reference to FIG. 2.

According to the linear superposition theory of thin plate deformation, force $F_a$ and force $F_b$ are simultaneously applied to positions Pa and Pb respectively, and a deformation amount at an observation position is a sum of deformation amounts when the forces $F_a$ and $F_b$ are separately applied to the positions Pa and Pb respectively.

Assume that the relative elastic coefficients of the position Pa relative to the sensing electrodes are $u_{a0}$, $u_{a1}$, . . . , $u_{a8}$, and the relative elastic coefficients of the position Pb relative to the sensing electrodes are $u_{b0}$, $u_{b1}$, . . . , $u_{b8}$, then the relative elastic coefficients of the positions Pa and Pb relative to the sensing electrodes can be calculated according to the above interpolation method.

According to the above analysis, if the fore $F_a$ is applied to the position Pa and the raw feature value $R_j$ (j=0, 1, L, 8) of each sensing electrode is introduced into the R-F curve $R_j=f_j(\theta_j, F)$ (j=0, 1, K 8) corresponding to the sensing electrode, then the calculated force is $F_a/u_{aj}$ (j=0, 1, L, 8).

Analogously, if the fore $F_b$ is applied to the position Pa and the raw feature value $R_j$ (j=0, 1, L, 8) of each sensing electrode is introduced into the R-F curve $R_j=f_j(\theta_j, F)$ (j=0, 1, K 8) corresponding to the sensing electrode, and the calculated force is $F_b/u_{bj}$ (j=0, 1, L, 8).

In this case, when the forces $F_a$ and $F_b$ are simultaneously applied to the positions Pa and Pb respectively, the raw feature value $R_j$ (j=0, 1, L, 8) of each sensing electrode is introduced into the R-F curve $R_j=f_j(\theta_j, F)$ (j=0, 1, K 8) corresponding to the sensing electrode, and the calculated force shall be $F_j=F_a/u_{aj}+F_b/u_{bj}$ (j=0, 1, L, 8).

Analogously, if M force $F_{p_1}$, . . . , $F_{p_M}$ are simultaneously applied to positions $p_1$, . . . , $p_M$ respectively, the following set of equations may be established:

$$\begin{cases} F_0 = F_{p_1}/u_{p_1 0} + L + F_{p_M}/u_{p_M 0} \\ M \\ F_8 = F_{p_1}/u_{p_1 8} + L + F_{p_M}/u_{p_M 8} \end{cases} \quad (1)$$

The force $F_{p_1}$, . . . , $F_{p_M}$ may be obtained by solving Q(Q≥M) equations from formula (1) via the least square method, wherein Q and M are both a positive integer. Assume that the sensing electrodes corresponding to the selected Q equations are $j_1$, L, $j_Q$ (0≤$j_1$, L, $j_Q$≤8), then it has:

$$\begin{cases} F_{j_1} = F_{p_1}/u_{p_1 j_1} + L + F_{p_M}/u_{p_M j_1} \\ M \\ F_{j_Q} = F_{p_1}/u_{p_1 j_Q} + L + F_{p_M}/u_{p_M j_Q} \end{cases} \quad (2)$$

Assume that $$U = \begin{bmatrix} 1/u_{p_1 j_1} & L & 1/u_{p_M j_1} \\ M & M & M \\ 1/u_{p_1 j_Q} & L & 1/u_{p_M j_Q} \end{bmatrix}, f' = [F_{j_1}, L, F_{j_M}]^T \text{ and}$$

$$f = [F_{P_1}, L, F_{P_M}]^T,$$

then the least square solution $f=(U^TU)^{-1} U^Tf$ of formula (2) is the force applied to various positions.

Theoretically, the force $F_{P_1}, \ldots, F_{P_M}$ may be obtained by solving any $Q(Q \geq M)$ equations. Due to impacts of the signal-to-noise ratio (SNR), different manners of selecting the equations results in different errors in the calculated results. The equations may be selected with reference to the coordinate information reported by the touch system, and the equations corresponding to the sensing electrodes in the vicinity of the press positions or the equations corresponding to the sensing electrodes whose raw feature value varies more greatly before and after the press are preferably selected. The force calculation method according to the embodiment of the present invention is not limited to the above mentioned least square method. In other embodiments, the above least square method may be optimized. For example, the weighted least square (WLS) method may be employed to further reduce the error.

With the above process, when a plurality of positions is pressed by a plurality of force touches, force information at each position may be accurately acquired. In practice, multi-finger press detection may be implemented on the touch screen by using fewer electrodes, thereby reducing the cost and improving the user experience.

Embodiment 3

Figure 9:
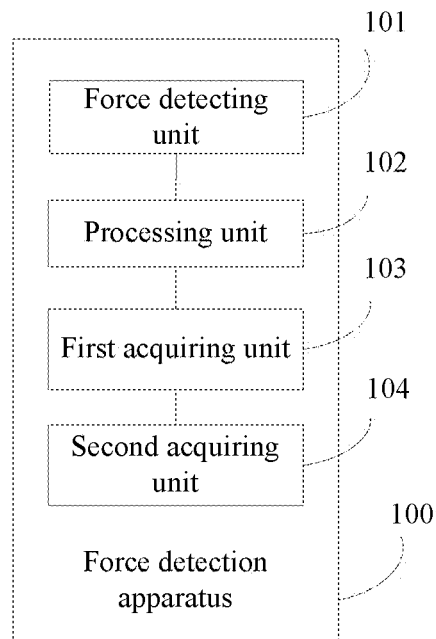
FIG. 9 is a schematic structural diagram of a force detection apparatus according to an embodiment of the present invention.

Referring to FIG. 9, FIG. 9 is a schematic structural diagram of a force detection apparatus 100 according to the present invention. The force detection apparatus 100 includes: a force detecting unit 101, a processing unit 102, a first acquiring unit 103, and a second acquiring unit 104.

The force detecting unit 101 is configured to acquire a deformation caused by external force and identified by at least one sensing electrode, and convert the deformation into a corresponding raw feature value characterized by an electrical signal, the raw feature value is corresponding to the force.

The processing unit 102 is configured to calculate force information fed back by the at least one sensing electrode according to the raw feature value of the at least one sensing electrode. The processing unit 102 is specifically configured to: introduce the acquired raw feature value of each sensing electrode into the force curve corresponding to the sensing electrode; read prestored data of the relative elastic coefficient of the current logic channel relative to the sensing electrode; and rectify the calculated force according to the data of the relative elastic coefficient, and output a final result according to the rectified force.

The first acquiring unit 103 is configured to acquire the force curve corresponding to each of the sensing electrode, wherein the force curve represents a relationship between the raw feature value of the corresponding sensing electrode and the force.

The second acquiring unit 104 is configured to acquire a relative elastic coefficient of each sensing electrode relative to any position, wherein the relative elastic coefficient is used to represent a difference of deformation of the same sensing electrode when force is applied to different positions of the sensing electrode. The second acquiring unit 104 is specifically configured to: divide the entire touch screen into a plurality of regions, each region is configured as a logic channel; press the center of each region with predetermined force, and record feature data of each sensing electrode; put the recorded feature data of each sensing electrode into a force curve corresponding to each sensing electrode to calculate the force to get calculated force; and calculate the relative elastic coefficient of each logic channel relative to each sensing electrode according to the calculated force.

In an embodiment of the present invention, when the press position does not fall at the center of the logic channel, the force detection module 100 estimates the relative elastic coefficient at the press position according to the relative elastic coefficient of the logical channel adjacent to the press position.

In other embodiments of the present invention, the force curves and the relative elastic coefficients may be preestablished and prestored. The pre-stored force curves and relative elastic coefficients may be directly read when the force information needs to be acquired.

In an embodiment of the present invention, when M different positions are respectively pressed by M force, the force detection module 100 establishes a set of equations based on force fed back by the sensing electrodes and relative elastic coefficients at the M positions relative to the sensing electrodes, and selects Q equations from the set of equations to solve the force corresponding to each position, wherein Q and M are both a positive integer, and $Q \geq M$.

The force detection apparatus according to the above embodiment may perform the force detection method according to the embodiments of the present invention, thus has corresponding function modules for performing the method, and achieves the corresponding beneficial effects.

Embodiment 4

Figure 10:
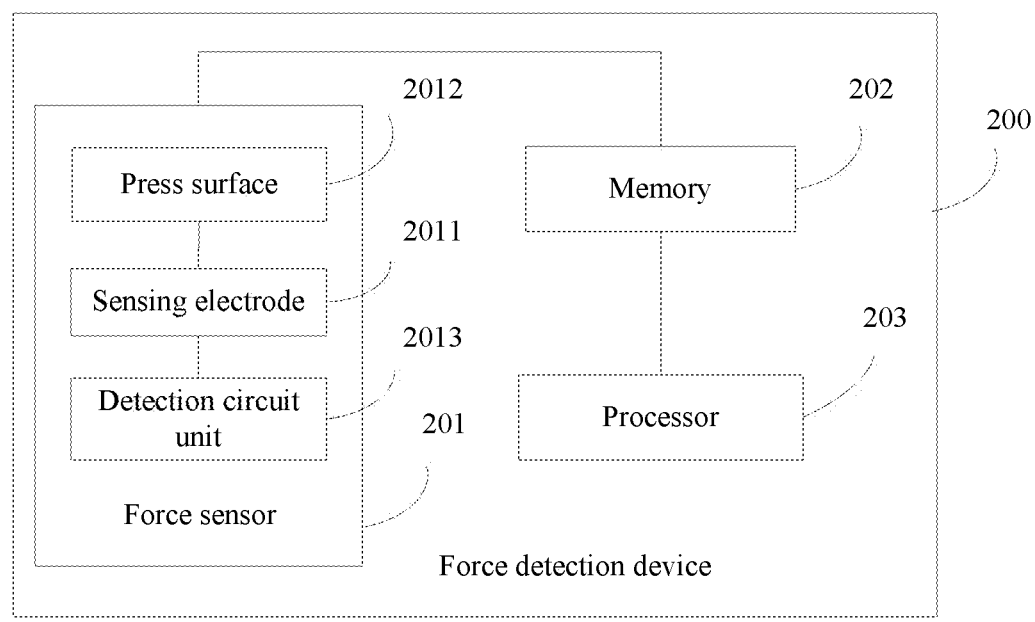
FIG. 10 is a schematic structural diagram of a force detection device according to an embodiment of the present invention.

Referring to FIG. 10, FIG. 10 is a schematic structural diagram of a force detection device 200 according to the present invention. The force detection device 200 includes: a force sensor 201, at least one processor 202 and a memory 203.

The force sensor 201 can be formed by at least one sensing electrode 2011, and configured to identify a deformation caused by external force applied thereto, and convert the deformation into a corresponding raw feature value characterized by an electrical signal, the raw feature value is corresponding to the force. The force sensor 201 includes a resistive sensor and/or a capacitive sensor. In an embodiment of the present invention, the force sensor 201 is a capacitive sensor. The number of sensing electrodes 2011 may be defined according to the actual needs. Considering the cost and performance, in the embodiment of the present invention, the number of sensing electrodes 2011 is 9, which is, however, not limited to 9.

The force sensor 201 further includes a press surface 2012 and a detection circuit unit 2013; wherein when external force is applied to the press surface 2012, a deformation of the press surface 2012 causes a capacitance variation between the press surface 2012 and the sensing electrode 2011, and the detection circuit unit 2013 is configured to identify the capacitance variation and convert the variation into an electrical signal, the electrical signal is output in specific format as the raw feature value representing a corresponding press force.

The at least one processor 202 is configured to calculate force information fed back by the at least one sensing electrode according to the raw feature value of the at least one sensing electrode 2011. The processor 202 is configured to perform all or a part of the steps in the method described above. The calculation process of the force information may be referenced to the above method embodiment, which is not described herein any further.

The memory 203 is configured to store data supporting normal operation of the processor 202. The memory 203 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a random-access memory (RAM) a read-only memory (ROM), a magnetic memory, a flash memory, a magnetic or an optical disk.

In the embodiments of the present invention, external force may be detected in real time and accurately by using the force detection device, and the external force may be converted into corresponding force information.

Detailed above are exemplary embodiments of the present invention, but the implementation manners of the present invention are not limited by the above embodiments. Any change, modification, replacement, combination, and simplification made within the spirit and principle of present invention should be equivalent displacement manners, and shall fall within the protection scope of the present invention.

What is claimed is:

1. A force detection device, comprising:
a force sensor, comprising at least one sensing electrode, and configured to identify a deformation caused by external force applied to the force sensor, and convert the deformation into a corresponding raw feature value characterized by an electrical signal, wherein the raw feature value is corresponding to the force;
at least one processor, configured to
acquire a force curve corresponding to each of the at least one sensing electrode, wherein the force curve represents a relationship between the raw feature value of the corresponding sensing electrode and the force, wherein the force curve is acquired by way of directly presetting or independently establishing,
acquire a relative elastic coefficient of a position relative to each sensing electrode, wherein the elastic coefficient is acquired by way of directly presetting or independently establishing, and the relative elastic coefficient is configured to indicate a difference of deformation of the sensing electrode when force is applied to different positions relative to the sensing electrode, and
calculate force information fed back by the at least one sensing electrode according to the raw feature value of the at least one sensing electrode; and
a memory, configured to store data supporting normal operation of the processor.

2. The force detection device according to claim 1, wherein the force sensor comprises a resistive sensor and/or a capacitive sensor.

3. The force detection device according to claim 2, wherein the force sensor further comprises a press surface and a detection circuit unit; wherein when the external force is applied to the press surface, the deformation of the press surface causes a resistance and/or capacitance variation between the press surface and the sensing electrode, and the detection circuit unit is configured to identify the resistance and/or capacitance variation and convert the variation into an electrical signal, the electrical signal is output in a specific format to be the raw feature value representing a corresponding press force.

4. A force detection method, comprising:
receiving a deformation caused by external force and identified by at least one sensing electrode;
converting the deformation into a corresponding raw feature value characterized by an electrical signal, wherein the raw feature value corresponds to the force;
acquiring a force curve corresponding to each of the at least one sensing electrode, wherein the force curve represents a relationship between the raw feature value of the corresponding sensing electrode and the force, wherein the force curve is acquired by way of directly presetting or independently establishing;
acquiring a relative elastic coefficient of a position relative to each sensing electrode, wherein the elastic coefficient is acquired by way of directly presetting or independently establishing, and the relative elastic coefficient is configured to indicate a difference of deformation of the sensing electrode when force is applied to different positions relative to the sensing electrode; and
calculating force information fed back by the at least one sensing electrode according to the raw feature value of the at least one sensing electrode.

5. The force detection method according to claim 1, wherein the acquiring a relative elastic coefficient of a position relative to each sensing electrode comprises:
dividing an entire touch screen into a plurality of regions, each region is configured as a logic channel;
recording feature data of each sensing electrode when been pressed at the center of each region by predetermined force, and;
introducing the recorded feature data of each sensing electrode into the force curve corresponding to each sensing electrode to obtain calculated force; and
calculating the relative elastic coefficient of each logic channel relative to each sensing electrode according to the calculated force.

6. The force detection method according to claim 5, wherein the calculating force information fed back by each sensing electrode according to the raw feature value of the sensing electrode comprises:
introducing the acquired raw feature value of each sensing electrode into the force curve corresponding to the sensing electrode;
reading prestored data of the relative elastic coefficient of the current logic channel relative to the sensing electrode; and
rectifying the calculated force according to the data of the relative elastic coefficient, and outputting a final result.

7. The force detection method according to claim 6, wherein when the press position does not fall at the center of the logic channel, the relative elastic coefficient at the press position is estimated according to the relative elastic coefficient of the logical channel adjacent to the press position.

8. The force detection method according to claim 6, wherein when M different positions are respectively pressed by M forces simultaneously, a set of equations is established based on forces fed back by the sensing electrodes and relative elastic coefficients at the M positions relative to the sensing electrodes, and Q equations are selected from the set of equations to solve the force corresponding to each position, wherein Q and M are both positive integers, and Q≥M.

* * * * *